UNITED STATES PATENT OFFICE 2,327,236

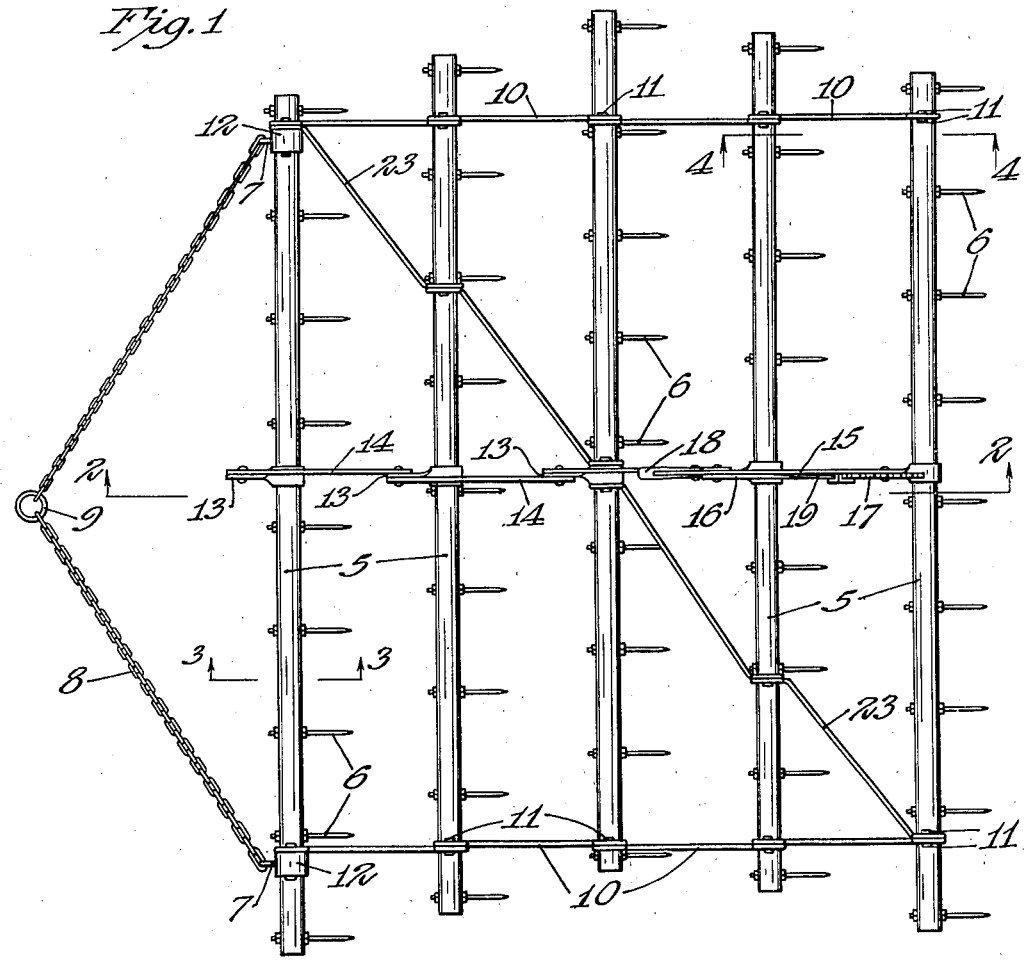
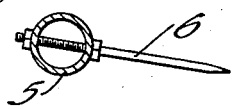
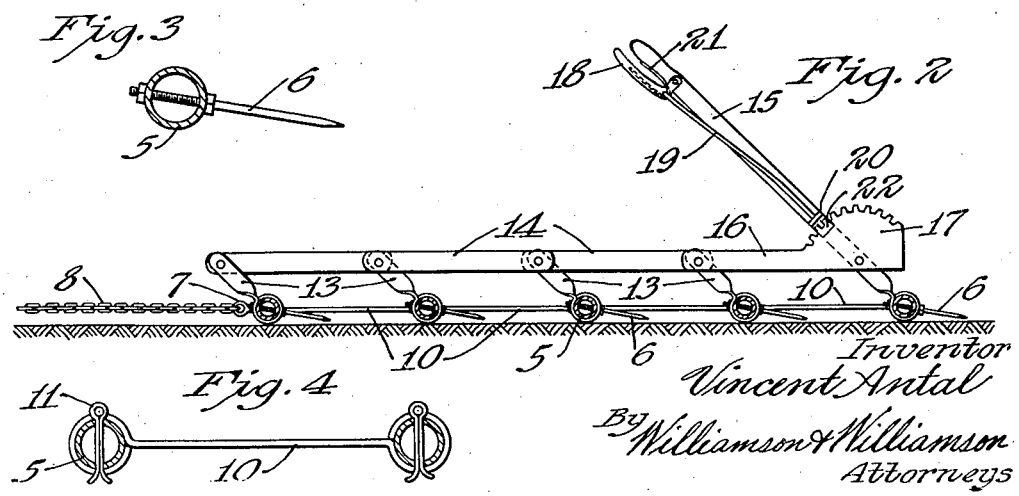

FLEXIBLE ADJUSTABLE LEVER DRAG HARROW

Vincent Antal, Owatonna, Minn.

Application June 1, 1942, Serial No. 445,277

1 Claim. (Cl. 55—103)

This invention relates to drag harrows.

It is a general object of this invention to provide a novel and improved drag harrow which is not only flexible so that it will ride over uneven ground surfaces properly but which is also adjustable so that all the teeth of the harrow can be variably set to similar angular positions relative to the ground causing all teeth to act similarly at the proper depth in the ground when the harrow is in use.

Another object is to provide a flexible adjustable drag harrow with means preventing undue side draft of the harrow while in operation.

The objects and advantages of the present invention will more fully appear from the following description made in connection with the accompanying drawing, wherein like reference characters refer to the same or similar parts throughout the various views, and in which—

Fig. 1 is a plan view of a harrow embodying the invention;

Fig. 2 is a vertical section taken on the line 2—2 of Fig. 1;

Fig. 3 is a vertical section taken as on the line 3—3 of Fig. 1 as indicated by the arrows; and Fig. 4 is a vertical section taken as on the line 4—4 of Fig. 1 as indicated by the arrows.

In accordance with the invention there are provided a plurality of spaced bars 5 which are illustrated as being of tubular form and each of these bars has mounted therein a multiplicity of spaced drag teeth 6. The bars are so disposed from front to rear of the machine that the different teeth 6 of the several bars will be staggered so as to secure as complete coverage as possible over the ground that the harrow works. The forward bar 5 carries eyes 7 to which chains 8 are secured at their outer ends, these chains being in turn connected to a ring 9 whereby the harrow may be hitched to be trailed as behind a horse, or behind a tractor, or other vehicle.

There are provided a plurality of links 10 and each of these links is provided with an eye at each end thereof. The adjacent bars 5 are closely interconnected together by means of pairs of these links 10, the eyes of the links being of such size as to encircle the tubular bars 5 and to permit free turning or swinging movement of the bars relative to the links and, therefore, raising movement of one bar relative to another and raising movement of one end of one bar relative to the other end of the same bar. The various links 10 which interconnect the several bars 5 are disposed in substantial alignment adjacent the two sides of the machine and the links are suitably retained on the several bars to prevent sliding movement of the links relative to the bars and the bars relative to the links as by means of cotter keys 11 passing through the bars or in some cases by means of certain of the teeth 6 or by brackets 12 to which the eyes 7 are fastened. It should perhaps be stated that the eyes 7 are mounted in the sleeve like brackets 12 which permit rotational movement of the forward bar 5 relative to the eyes 7.

Fixed to the central part of each of the bars 5 with the exception of one (the rear bar 5 in the illustrated embodiment) is an upstanding short arm 13 and the adjacent arms of the adjacent bars are pivotally interconnected by means of links 14. One of the bars 5 (the rear bar in the illustrated embodiment) has fixed thereto a lever 15 which has the function of one of the arms 13 and this lever is pivotally interconnected with the adjacent arm 13 of the next adjacent bar by means of a special link 16 carrying a toothed segment 17. At the handle end of the lever 15 a bell crank 18 is provided and a rod forming a pawl 19 is provided connected to the bell crank 18, runs through a guide 20 near the lower part of the lever 15 and is adapted to cooperate with the toothed segment 17. A bar spring 21 acts between the handle of the lever 15 and the bell crank 18 to normally hold the pawl in its extended position engaged with one of the teeth of the segment 17. Preferably the lever 15 adjacent the toothed segment 17 is provided with an angular member 22 which overlies the teeth of the segment and through which the pawl 19 passes, this angular member being employed in the usual manner to retain the lower end of the pawl in proper cooperative relation with the toothed segment.

To brace and strengthen the harrow and to eliminate side draft and side movement of the various bars 5 relative to each other, there is provided a plurality of diagonal braces 23 which extend preferably as from the front right corner of the harrow to the left rear corner thereof in substantially a continuous line. Each brace 23 has offset eyes at its two ends through which a pair of adjacent bars 5 extend whereby the bars can completely rotate relative to these braces. Lateral shifting movement of the bars 5 relative to the braces 23 is prevented by cotter keys 11 or in some instances by teeth 6 or in some instances by one of the arms 13 or by links 10.

When in use the harrow will be dragged over the field in the usual manner and by reason of the fact that each bar 5 is pivotally interconnected to its neighbor each bar may rise or fall relative to its neighbor to conform to the uneven structure of the ground and as the links 10 and the braces 23 are rather loosely connected to the several bars one end of a particular bar may rise or lower relative to the other end thereof and also relative to its neighbor bars. Accordingly the harrow has extreme flexibility. While the harrow is flexible the lever 15 can be operated to simultaneously turn all of the bars 5 relative to the links 10 and the braces 23, and it should be noted that as each bar 5 is equipped with an arm 13 all of the bars when swung are turned to the same angular setting, so that the teeth 6 of all the bars will similarly act on the ground in any set position of the bars. Of course, the pawl 19 cooperating with the tooth segment 17 will hold the bars swung to the desired angular position so that the teeth will be properly extended for penetrating to the proper depth desired into the ground.

In most flexible harrows side draft is not restrained and thus when a harrow is used on a hill side shifting movement of the bars can take place to throw the teeth of the several bars out of proper staggered relation. In the case of my harrow the diagonal braces 23 prevent this side draft action while not interfering with the flexibility of the harrow.

It will be seen that a highly effective flexible adjustable drag harrow has been provided.

It will, of course, be understood that various changes may be made in the form, details, arrangement and proportions of the various parts without departure from the scope of the present invention which generally stated consists in the matter shown and described and set forth in the appended claim.

What is claimed is:

A flexible adjustable harrow comprising, a plurality of spaced toothed bars including a forward bar and a rearward bar and intermediate bars, links interconnecting adjacent bars and relative to which the bars are turnable, means interconnecting the bars for turning them simultaneously, and diagonal braces extending between adjacent bars and relative to which the bars are turnable, the adjacent ends of adjacent diagonal braces being contiguous so that said braces extend in substantially a continuous diagonal line from one end of the forward bar to the opposite end of the rearward bar.

VINCENT ANTAL.